(No Model.)
H. W. WINTER.
TOP LIFT HOLDER FOR HEELING MACHINES.
No. 401,621. Patented Apr. 16, 1889.
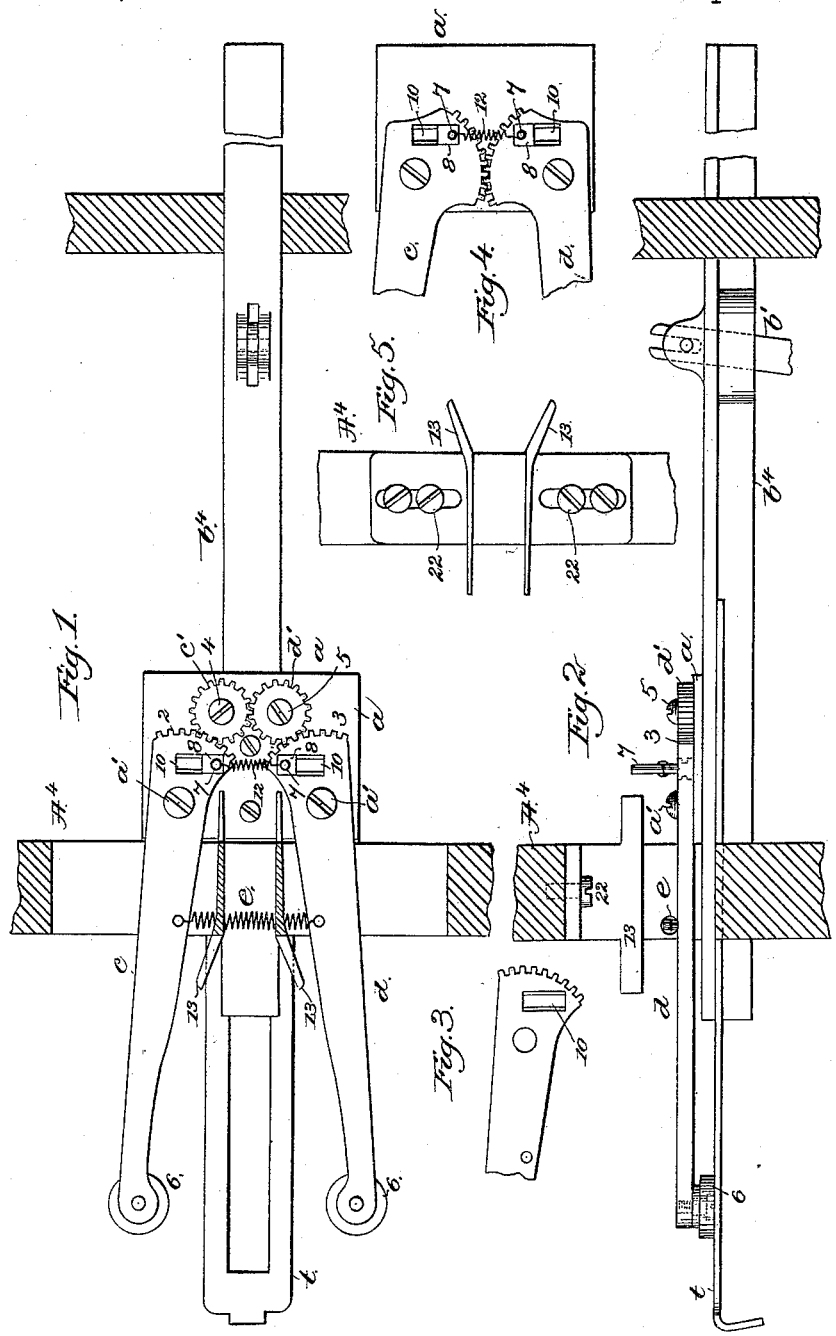

UNITED STATES PATENT OFFICE.

HENRY W. WINTER, OF BOSTON, ASSIGNOR TO JAMES W. BROOKS, TRUSTEE, OF CAMBRIDGE, MASSACHUSETTS.

TOP-LIFT HOLDER FOR HEELING-MACHINES.

SPECIFICATION forming part of Letters Patent No. 401,621, dated April 16, 1889.

Application filed September 18, 1888. Serial No. 285,718. (No model.)

*To all whom it may concern:*

Be it known that I, HENRY W. WINTER, of Boston, county of Suffolk, State of Massachusetts, have invented an Improvement in Top-Lift Holders or Carriers for Heeling-Machines, of which the following description, in connection with the accompanying drawings, is a specification, like letters on the drawings representing like parts.

This invention has for its object to provide a top-lift carrier with pivoted arms made movable positively together in opposite directions toward and from the side edges of the top lift by means of toothed gearing, my invention being an improvement on that described in United States Patent No. 377,301.

In accordance with my invention the pivoted arms for engaging the side edges of and controlling the position of the top lift are provided with a series of teeth, in order that when one arm is moved the other arm will be correspondingly and positively moved in the opposite direction.

In one form of my invention the teeth of the arms are engaged with toothed gears which are in mesh with each other. The holding portions or surfaces of the said arms may be separated to release a top lift by or through arm-separating devices, shown as cams or projections which act upon studs or projections of the arm, as will be described.

My invention in top-lift carriers or holders consists, essentially, in a slide-bar and pivoted arms connected by teeth, combined with arm-separating devices to automatically and simultaneously move the said arms for like distances in opposite directions, as will be described; also, in the combination, with a slide, two pivoted arms provided with teeth and geared together, and a spring to normally close the said arms, of sliding spring-connected studs, as will be described; also, in a heel-nailing machine, the slide-bar and the two pivoted arms having teeth, combined with gears in engagement with the teeth of the said arms and with each other, substantially as will be described.

Figure 1 is a top or plan view of a sufficient portion of a top-lift carrier embodying my invention to enable the same to be understood, the slide-bar carrying the arms being in its rearmost position and holding a top lift. Fig. 2 is a side elevation of the devices shown in Fig. 1. Fig. 3 shows the rear end of one of the arms to represent the slot therein. Fig. 4 represents a modified form of my invention, wherein the two arms are directly geared together without the intervention of supporting-pinions; and Fig. 5 is a detail to be referred to.

The slide-bar $b^4$ and lever $b'$, to reciprocate it, and the auxiliary slide-bar $t$, are all substantially as in United States Patent No. 337,301, to which reference may be had. The plate $a$, connected rigidly to the bar $b^4$ by a suitable screw, has pivoted to it by screw-studs $a'$ two like arms, $c\ d$, provided at their rear ends with teeth, as at 2 3, the teeth of the said arms, as shown in Figs. 1 and 2, being engaged, respectively, by like gears, $c'\ d'$, on the screw-studs 4 5, the said gears being in mesh each with the other, the studs 4 5 being held in the plate $a$. The arms $c$ and $d$ at their outer ends are provided with like rollers, 6, to bear against the edges of the top lift.

The arms $c\ d$ are connected by a strong spiral spring, $e$, which keeps the rollers 6 firmly in engagement with the edges of the top lift throughout the entire forward stroke of the slide-bar $b^4$.

The arms $c\ d$ at their inner ends are provided with dovetailed slots 10, which receive loosely dovetailed blocks 8, having studs 7, the blocks sliding in the said grooves, and being held normally at the inner ends of the said grooves by a spiral spring, 12, of but little strength—a spring of very much less strength than the spring $e$.

As the slide-bar $b^4$ is started forward from its position, Fig. 1, to place the top lift held between the arms $c\ d$ in position with relation to the usual nail-box and shoe to bring the top lift upon the heel, the studs 7 meet the outer sides of the like arm-spreading devices, shown as projections or cams, 13, and are by the said cams moved outwardly, the blocks 8 sliding in the slots 10, but the arms are not turned about their pivots or fulcra; but when the top lift has been blinded upon the heel and the slide-bar is retracted then the studs 7 strike against the inner sides of the said cams 13, and at this time the arms $c$ $d$ are opened by the cams until the rolls at their ends have arrived in position to engage a second top lift, which will be supplied from a case or box, substantially as in United States Patent No. 374,894, the spring $e$ acting to close the arms $c\ d$ upon the top lift as soon as studs 7 pass from the right-hand ends of the cam-surfaces 13. These cam-surfaces, as best shown in Fig. 5, are adjustably attached to a part of the frame-work $A^4$ by means of adjusting-screws 22.

In the modification, Fig. 4, the teeth upon the arms $c\ d$ occupy a position different from that shown in Fig. 1, so that the teeth of the arms are directly engaged with each other rather than by the independent gears $d'$ and $c'$.

I am aware that a heel-lift holder has been provided with jaws pivoted to a movable head, as represented in United States Patent No. 153,786; but therein the said jaws are not toothed, nor are they geared together so that the movement of one jaw insures the movement of the other jaw by a connection between the two jaws.

I do not herein claim sliding clamps actuated by gearing and adapted to clamp a top lift near its breast end; nor do I claim to be the first to move pivoted top-lift-holding arms positively for equal distances in opposite directions.

I claim—

1. In a top-lift carrier, a slide-bar and two arms pivoted thereon and provided with gear-teeth and geared together, substantially as described, combined with arm-spreading devices to turn the said arms, the said teeth insuring the movement of the said arms together in opposite directions positively for like distances, substantially as described.

2. The pivoted arms $c\ d$, provided with teeth and geared together, the spring $e$, and the sliding spring-connected studs 7, combined with the arm-spreading devices, co-operating with the said studs to effect the opening of the jaws as they are being retracted, substantially as described.

3. In a heel-nailing machine, the pivoted arms having teeth, as 2 3, combined with the gears $c'\ d'$, engaging the said teeth and engaged each with the other, substantially as described.

In testimony whereof I have signed my name to this specification in the presence of two subscribing witnesses.

HENRY W. WINTER.

Witnesses:
G. W. GREGORY,
B. DEWAR.